June 3, 1969            D. A. BROSK            3,447,165
COMBINATION GARMENT AND TOY
Filed May 10, 1967
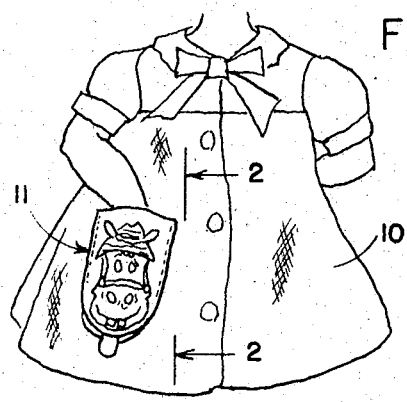
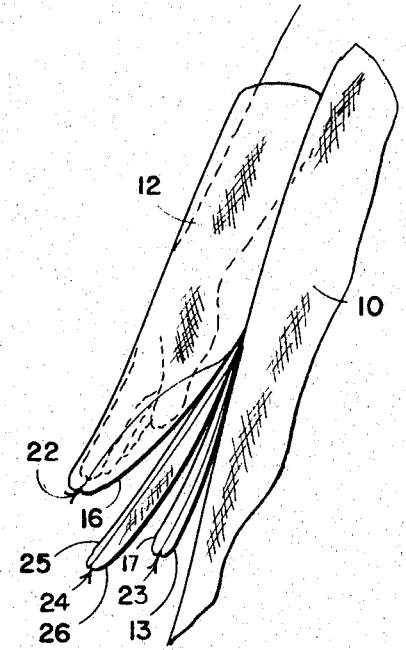
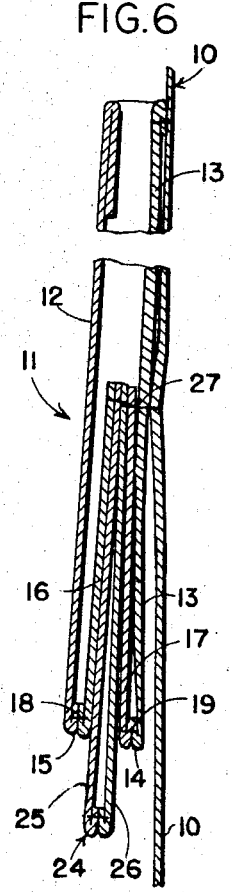
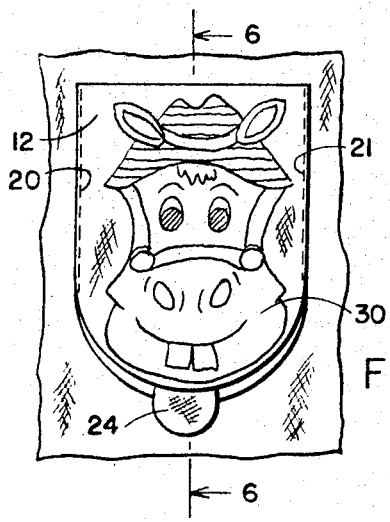
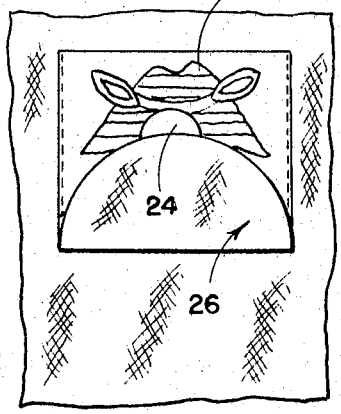
*INVENTOR*
Doris Brosk
*by* Sparrow and Sparrow
ATTORNEYS.

United States Patent Office 3,447,165
Patented June 3, 1969

3,447,165
COMBINATION GARMENT AND TOY
Doris A. Brosk, 150 E. 69th St., New York, N.Y. 10021
Filed May 10, 1967, Ser. No. 637,577
Int. Cl. A41d *11/00, 27/20;* A63h *13/00, 3/14*
U.S. Cl. 2—75      2 Claims

ABSTRACT OF THE DISCLOSURE

A combination child's garment, such as a dress, and toy, the latter providing a dual function of pocket and toy having movable parts which when the child places its hand in the pocket and manipulates the hand the pocket simulates animation.

Background of the invention

The field of art to which the invention pertains comprises garments, such as dresses, jumpers, coats, or like articles of wearing apparel, wherein the said article is provided with a pocket or similar device which provides the dual function of utility and entertainment.

Summary

This invention provides a combination garment and toy which not only is useful as wearing apparel but also for entertainment of the wearer of the garment and those viewing the garment. It essentially comprises a garment or similar wearing apparel particularly for children, having a body and a pocket formed on or made integral with the body of the garment, the pocket being constructed in such manner that it simulates animation when the child's hand is placed in the pocket and its fingers or hand manipulated therein. Thus, if the pocket depicts an object, such as simulation of the head and face of an animal, animation is imparted thereto.

Brief description of the drawing

In the following description and in the claims, parts will be identified by specific names for convenience, but such names are intended to be as generic in their application to similar parts as the art will permit. Like reference characters denote like parts in the several figures of the drawing, in which:

FIG. 1 is a front view of a child's dress embodying the invention;

FIG. 2 is a perspective detail taken along line 2—2 of FIG. 1, showing a child's hand in a portion of the pocket expanded from the dress;

FIG. 3 is a detail front view of the pocket;

FIG. 4 is a view similar to FIG. 3, with the outer flap raised disclosing the tongue and inner flap of the pocket;

FIG. 5 is a view similar to FIG. 4, showing both the inner and outer flaps and the tongue raised; and FIG. 6 is a detail section of the complete pocket taken through line 6—6 of FIG. 3.

Description of preferred embodiment

The drawing depicts the invention as being embodied in a child's dress. However, it is quite understood that the invention is applicable to any suitable article of wearing apparel, such as a coat, apron, jumper, smock and etc.

Referring to the drawing, the reference numeral 10 illustrates the body of a child's dress having a pocket generally indicated by the reference numeral 11, positioned in front thereof.

Pocket 11 comprises a flexible front wall 12 and a flexible rear wall 13, preferably arcuately formed at their respective lower portions 14 and 15, a flexible inner panel or member 16 connected to front wall 12 and a flexible inner panel or member 17 connected to rear wall 13, inner member 16 being preferably arcuate and substantially coterminus with arcuate portion 14 of wall 12 and inner member 17 being preferably arcuate and substantially coterminus with arcuate portion 15. The joining or connecting of member 16 to front wall 12 and member 17 to rear wall 13 may be accomplished by means of stitches 18 and 19 respectively. The front and rear walls 12 and 13 are each partially connected to a front portion of the body 10 of the dress as by means of stitches 20 and 21 which run only partially along or a portion of the edges thereof terminating a predetermined distance from the bottom of the pocket, thus providing double-walled flaps as clearly indicated by the reference numerals 22 and 23, respectfully (FIG. 2). Flap 22 may be slightly shorter than flap 23. Interposed between flaps 22 and 23 is an appendage 24 which may comprise the stitched together or otherwise connected layers 25 and 26. Flap 23 and the inner member 16 of flap 22 are connected to the body 10 of the dress, as for example by the stitches 27, so that the opening of pocket 11 is defined by front wall or panel 12, the portion of rear wall 13 connected to body 10 and inner member 16 which is connected to front wall 12.

Front member 12 may carry any suitable design or character. The character 30 depicted in the drawing fancifully simulates the head and face of a horse, the appendage 24, simulating the tongue of the animal.

Animation may be produced by the child placing its hand within the pocket 11 and by manipulation and movements of the hand and its fingers cause distortions of the face of the animal and or opening of its simulated mouth comprising the flaps 22 and 23.

It is readily understood that the pocket may simulate any configuration or character and by manipulation of a hand inserted in the pocket produce animation thereof.

From the foregoing it can be seen that there has been provided a garment comprising a body 10 and a pocket 11 which also serves as a toy. The pocket has a front wall 12 having the upper portion of its lateral edges secured to body 10 as by stitches 20 and 21, providing an upper portion and further providing an unconnected lower front wall portion. A flexible panel 16 is secured to this lower front wall portion in such manner that a lower pocket portion is formed in continuity with the upper pocket portion both pocket portions being adapted to receive a hand of the wearer of the garment for manipulation therein, the lower front portion of wall 12 and panel 16 constituting a flap 22. The front wall 12 carries a fanciful figure whereby by movement of the hand in the pocket, animation is imparted to said front wall. A flap 23 is preferably disposed at the rear of flap 22, both said flaps simulating, the mouth of the figure, and an appendage 24 may be inserted between the flaps simulating a tongue of the figure.

While the invention has been described and illustrated with respect to a certain example which gives satisfactory results, it will be understood by those skilled in the art after understanding the principle of the invention, that various changes and modifications may be made without departing from the spirit and scope of the invention.

I claim:
1. A garment comprising a body and a pocket disposed on said body, said pocket having a front wall having the upper portion of its lateral edges secured to said body providing an upper pocket portion and further providing an unconnected lower front wall portion, a flexible panel secured to said lower front wall portion in such manner that a lower pocket portion is formed in continuity with said upper pocket portion, said upper and said lower pocket portions being adapted to receive a hand of the wearer of the garment for manipulation therein, said lower front portion and said panel constituting a flap, said front wall carrying a fanciful figure, whereby by move- ment of said hand in said pocket, animation is imparted to said front wall, a second flap, said second flap being disposed at the rear of said first mentioned flap, both said flaps simulating the mouth of said figure, said second flap comprising two superposed layers secured together, said panel and said second flap being secured to said body by at least one transverse line of stitches closing said second flap and forming the inner extremity of the mouth of said figure whereby said flaps are a separable to impart movement to said mouth.

2. A garment comprising a body and a pocket disposed on said body, said pocket having a front wall having the upper portion of its lateral edges secured to said body providing an upper pocket portion and further provioding an unconnected lower front wall portion, a flexible panel secured to said lower front wall portion in such manner that a lower pocket portion is formed in continuity with said upper pocket portion, said upper and said lower pocket portions being adapted to receive a hand of the wearer of the garment for manipulation therein, said lower front portion and said panel constituting a flap, said front wall carrying a fanciful figure, whereby by movement of said hand in said pocket, animation is imparted to said front wall, a second flap, said second flap being disposed at the rear of said first mentioned flap, both said flaps simulating the mouth of said figure, an apendage interposed between said flaps simulating a tongue of said figure, and wherein said panel, said second flap and said appendage being secured to said body by at least one transverse line of stitches closing said second flap and forming the inner extremity of the mouth of said figure whereby said flaps are separable to impart movement to said mouth.

References Cited

UNITED STATES PATENTS

| 2,471,386 | 5/1949 | Carter | 2—247 |
| 2,686,313 | 8/1954 | Seidler | 2—75 XR |
| 2,840,950 | 7/1958 | Cotler | 46—154 XR |

H. HAMPTON HUNTER, *Primary Examiner.*

U.S. Cl. X.R.

2—247; 46—116, 154